(12) United States Patent
Jachmann

(10) Patent No.: US 7,537,624 B2
(45) Date of Patent: May 26, 2009

(54) CONDENSATE FILTER, PARTICULARLY FOR PNEUMATIC CLASSIFICATION MODULES

(75) Inventor: Robert Jachmann, Esslingen (DE)

(73) Assignee: Festo AG & Co. KG, Esslingen (DE)

( * ) Notice: Subject to any disclaimer, the term of this patent is extended or adjusted under 35 U.S.C. 154(b) by 563 days.

(21) Appl. No.: 11/105,086

(22) Filed: Apr. 13, 2005

(65) Prior Publication Data
US 2005/0229785 A1 Oct. 20, 2005

(30) Foreign Application Priority Data
Apr. 16, 2004 (DE) .................. 20 2004 005 983 U

(51) Int. Cl.
*B01D 45/12* (2006.01)
*B01D 46/00* (2006.01)
(52) U.S. Cl. .............................. 55/337; 55/423; 55/426
(58) Field of Classification Search .................. 95/273, 95/268, 416, DIG. 17; 55/337, 423–427, 55/DIG. 17, 416
See application file for complete search history.

(56) References Cited

U.S. PATENT DOCUMENTS

| | | | | |
|---|---|---|---|---|
| 1,702,804 A | * | 2/1929 | Winslow | 96/321 |
| 2,720,278 A | * | 10/1955 | Wiley | 55/318 |
| 2,849,079 A | * | 8/1958 | Evans | 55/392 |
| 2,917,131 A | * | 12/1959 | Evans | 55/424 |
| 3,269,097 A | * | 8/1966 | German | 55/337 |
| 3,378,993 A | * | 4/1968 | Veres et al. | 96/409 |
| 3,507,098 A | * | 4/1970 | Veres et al. | 96/409 |
| 5,228,890 A | * | 7/1993 | Soderlund et al. | 55/421 |

FOREIGN PATENT DOCUMENTS

| | | |
|---|---|---|
| DE | 7622478 | 2/1977 |
| DE | 8006 571 | 4/1982 |
| DE | 100 65 328 | 10/2001 |
| FR | 2 648 730 | 12/1990 |

* cited by examiner

*Primary Examiner*—Duane Smith
*Assistant Examiner*—Ives Wu
(74) *Attorney, Agent, or Firm*—Hoffmann & Baron, LLP

(57) ABSTRACT

A condensate filter, particularly for pneumatic classification modules, is suggested, which has a condensate container (10) having a filter system (19), a twist device (15), which sets the incoming air into rotation at the upper air inlet (14), and a partition plate (16), which divides the container interior into an upper filter chamber (17) containing the filter system (19) and a lower condensate collection chamber (18). The condensate collection chamber (18) is provided on the lower end with a condensate outlet (12). A peripheral wall region (24) of the pot-like partition plate (16) enlarges conically in diameter downward to the contact on the inner circumference of the condensate container (10) and has multiple condensate passage openings (25) extending up to the contact edge.

14 Claims, 2 Drawing Sheets

CONDENSATE FILTER, PARTICULARLY FOR PNEUMATIC CLASSIFICATION MODULES

FIELD OF THE INVENTION

The present invention relates to a condensate filter, particularly for pneumatic classification modules, having a condensate container which has a filter system, having a twist device, which sets the incoming air into rotation at the upper air inlet, and having a partition plate, which divides the container interior into an upper filter chamber containing the filter system and a lower condensate collection chamber, the condensate collection chamber being provided on the lower end with a condensate outlet.

BACKGROUND OF THE INVENTION

Such a condensate filter, which is attached to the bottom of a regulating valve, is known from the brochure "Wartungsgeräite MS-Reihe [Maintenance Devices MS Series]" from FESTO AG & Co, publication 408, page 83, under the name filter regulating valve LFR. In such a condensate filter, the air flowing in through the air inlet is set into rapid rotation with the aid of the twist device, so that liquid contained in the air precipitates on the inner wall of the condensate container and flows downward into the condensate collection chamber because of gravity, where it may flow out by opening the condensate outlet. The problem arises in this case that because of the rotating air column, the condensate is also set into rotation and is prevented from flowing out through the condensate outlet due to centrifugal force. In order to prevent this, a disk-shaped partition plate is attached below the filter system in the known arrangement, which forms a small annular gap to the inner wall of the condensate container. However, it has been shown that a condensate film frequently forms at this annular gap, which prevents the condensate from draining to the condensate collection chamber or at least makes it very difficult. Nonetheless, it has been shown that the air column and therefore the condensate in the condensate collection chamber are also disadvantageously set into rotation via this annular gap. A smoothing disk below the partition plate is to prevent this, but a quite cumbersome system, which is difficult to assemble, is thus achieved overall.

A system known from DE 7622478 U having a condensate filter also has a partition disk which forms a narrow annular gap toward the inner wall of the condensate container. The disadvantages already described arise in this case. In order to prevent the rotation in the condensate collection chamber, a quite complex rib system is additionally positioned therein, which is costly to manufacture and cumbersome to assemble.

OBJECTS AND SUMMARY OF THE INVENTION

The object of the present invention is to implement a partition plate in such a way that the rotational motion is effectively prevented from being transmitted into the condensate collection chamber and nonetheless good drainage of the condensate into this condensate collection chamber is ensured.

This object is achieved according to the present invention in that a peripheral wall region of the pot-like partition plate enlarges conically in diameter downward up to the contact on the inner circumference of the condensate container and has multiple condensate passage openings extending up to the contact edge.

Through the implementation according to the present invention of the partition plate, an annular gap along the inner wall of the condensate container and corresponding poor drainage of the condensate through such a gap are avoided. In addition, transmission of the rotational motion into the condensate collection chamber is avoided. Multiple condensate passage openings which extend up to the contact edge are provided for drainage of the condensate. These openings may be implemented having a large area, in contrast to the annular gap, and nonetheless prevent the transmission of the rotational motion into the condensate collection chamber because of the wall regions between the condensate passage openings. This partition plate may be manufactured easily and cost-effectively as a one-piece plastic part, only one element, specifically the partition plate, being able to be mounted very easily and cost-effectively.

At least the region of the partition plate pressing against the inner circumference of the condensate container is implemented as flexible for the elastic contact, in order to reliably avoid an annular gap and nonetheless ensure tolerance compensation.

The condensate passage openings, which are open around the edge, are advantageously implemented as slotted and particularly run axially. They also contribute to the flexibility of the peripheral wall region of the partition plate.

In order to prevent transmission of the rotational motion into the condensate collection chamber even more reliably, flow brake elements, which are expediently implemented as strip-like or lamellar, are provided on the inner side of the partition plate pointing away from the wall of the condensate container in the region of the condensate passage openings. They are preferably positioned along the delimitation lines of the condensate through openings and particularly extend perpendicularly to the inner wall surface of the partition plate.

The conical region of the partition plate is preferably attached to a flat disk or molded on in one piece in order to achieve a one-piece component.

The partition plate is expediently positioned on the bottom of the filter system or on its support.

An exemplary embodiment of the present invention is illustrated in the drawing and explained in greater detail in the following description.

DETAILED DESCRIPTION OF THE PREFERRED EMBODIMENTS

Figure 1:
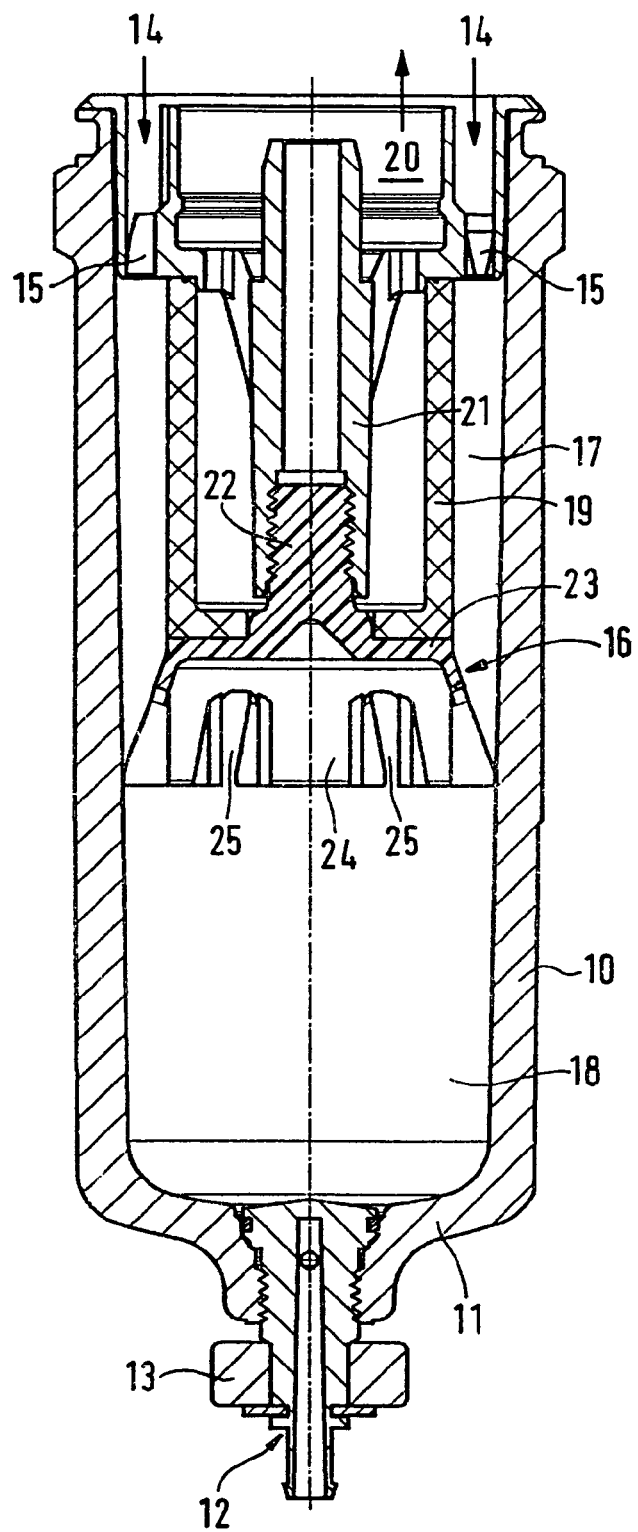
FIG. 1 shows a sectional illustration of a condensate filter having a partition plate.
Figure 2:
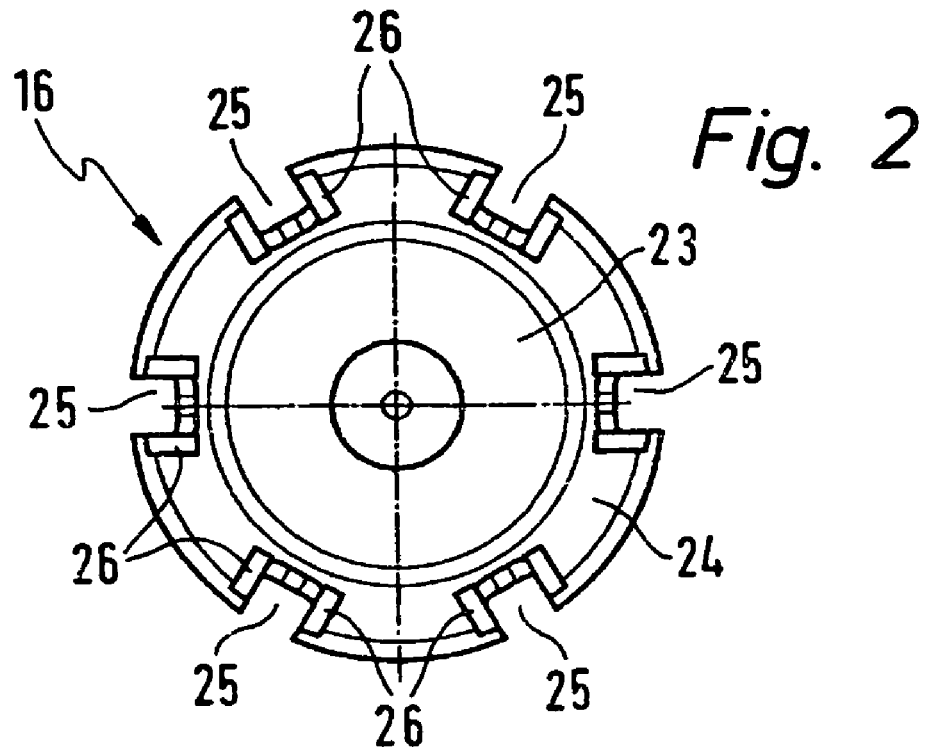
FIG. 2 shows a view of the interior of this partition plate from below.
Figure 3:
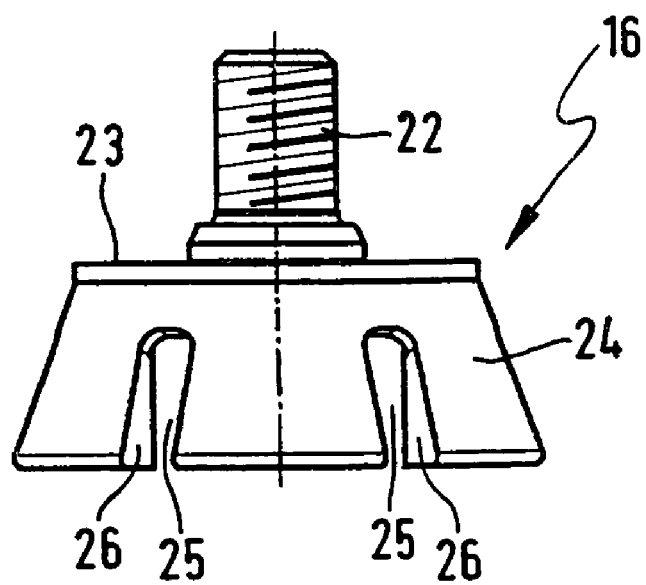
FIG. 3 shows a side view of this partition plate.

The condensate filter shown in FIG. 1 is used for separating condensate contained in air and, in addition, for filtering air and is typically used in connection with pneumatic classification modules. As may be inferred from the related art specified at the beginning, this condensate filter may be used together with a regulating valve as a filter regulating valve for a maintenance device, for example.

The condensate filter has a cylindrical housing, which is open on top, made of metal or plastic material, transparent plastic material being particularly suitable, since the level of precipitated condensate may then be recognized easily. In principle, glass is also suitable as a material. This housing 10 has a floor 11 on the lower end which is provided with a condensate drain valve 12, in order to drain off collected condensate. For this purpose, the condensate drain valve 12 is opened with the aid of an actuation element 13 and then closed again. Automatic condensate drain devices are also known, which may be used instead of this condensate drain valve 12.

An annular air inlet 14 is positioned on the upper end of the housing 10, through which air may flow into the housing interior of the housing 10. For this purpose, it passes a twist device 15, typically referred to as a twist disk, through which it is set into rotation in such a way that it flows along the inner wall of the housing 10 and precipitates the condensate contained therein there through friction and the centrifugal effect.

The interior of the housing 10 is divided into an upper filter chamber 17 and a lower condensate collection chamber 18 by a partition plate 16, which is positioned approximately centrally. A cylindrical air filter 19 is positioned in the upper filter chamber 17, through which the air, which has been freed of condensate, may reach the air outlet 20 of the condensate filter. The air filter 19 is positioned on a support 21, on which the partition plate 16 is also fixed with the aid of a concentric bolt 22. The bolt 22 may be implemented as a threaded bolt, for example.

The partition plate 16 comprises a flat disk, supporting the bolt 22, which forms the floor of the pot-like partition plate 16. This disk 23 presses against the air filter 19 in the assembled state. From the edge of the disk 23, a peripheral wall region 24 extends diagonally downward until it rests against the inner wall of the housing 10. At the same time, the diameter of this peripheral wall region enlarges continuously and conically up to the elastic contact on the inner wall of the housing 10. To avoid an annular gap between the partition plate 16 and the inner wall of the housing 10, the peripheral wall region 24 is implemented as elastic and thus presses elastically against the inner wall.

The peripheral wall region 24 of the partition plate 16 is provided with six slotted condensate passage openings 25, which extend in the axial direction and are open toward the contact edge at the inner wall of the housing 10. The peripheral wall region 24 is thus divided into six wing-like regions, which are separated from one another by the condensate passage openings 25.

Flow brake elements 26, which are implemented as strip-like and/or lamellar and each extend along the inner edges of the condensate passage openings 25, are molded onto the inner faces of the peripheral wall 24, facing radially inward away from the inner wall of the housing 10, along the condensate passage openings 25. These elements are aligned perpendicularly to the inner wall of the peripheral wall region 24.

The partition plate 16 is implemented overall in one piece from plastic, multipart embodiments also being conceivable. The number and shape of the condensate passage openings 25 is, of course, not restricted to that of the exemplary embodiment, but rather may be shaped variably. The lamellar flow brake elements 26 may also have a rectangular shape or another shape instead of the triangular shape of the exemplary embodiment.

The condensate precipitated by the rotation of the air in the filter chamber 17 runs downward because of gravity and reaches the condensate collection chamber 18 through the condensate passage openings 25 of the partition plate 16, where it may be drained off using the condensate drain valve 12. The rotation of the air may not be transmitted or may only be transmitted slightly into the condensate collection chamber 18 because of the axially aligned condensate passage openings 25. This effect is also supported by the flow brake elements 26. The condensate in the condensate collection chamber 18 is therefore not or almost not set into rotation, so that the condensate collection chamber 18 may be emptied completely. The condensate therefore also does not rise along the inner wall of the housing 10.

What is claimed is:

1. A condensate filter, particularly for pneumatic classification modules, having a condensate container which has a filter system, having a twist device, which sets the air flowing in into rotation at the upper air inlet, and having a partition plate which divides the container interior into an upper filter chamber containing the filter system and a lower condensate collection chamber, the condensate collection chamber being provided on the lower end with a condensate outlet, wherein a peripheral wall region of the pot-like partition plate enlarges conically in diameter downward to the contact on the inner circumference of the condensate container and has multiple condensate passage openings extending up to the contact edge, each of said condensate passage openings provided with two flow brake elements for preventing transmission of rotational motion of the air past said partiton plate.

2. The condensate filter according to claim 1, wherein at least the region of the partition plate pressing against the inner circumference of the condensate container is implemented as flexible for the elastic contact.

3. The condensate filter according to claim 1, wherein the condensate passage openings, which are open at the edge, are implemented as slotted and run in the axial direction.

4. The condensate filter according to claim 1, wherein said twist device rotates the air about an axis of rotation, and wherein said flow brake elements are provided on the inner side of the partition plate and have planar faces disposed parallel with said axis of air rotation for stopping the rotational motion of the air, said planar faces facing away from the inner wall of the condensate container, in the region of the condensate passage openings.

5. The condensate filter according to claim 4, wherein said two flow brake elements are positioned along the delimitation lines of the condensate passage openings perpendicularly to the inner wall of the partition plate.

6. The condensate filter according to claim 4, wherein the flow brake elements are implemented as strip-like or lamellar and have a triangular shape.

7. The condensate filter according to claim 1, wherein the conical peripheral wall region of the partition plate is attached or molded on in one piece to a flat disk.

8. The condensate filter according to claim 1, wherein the partition plate is positioned on the bottom of the filter system or on its support.

9. The condensate filter according to claim 1, wherein the interior of the tubular filter system is connected to an air outlet.

10. A condensate filter for a pneumatic classification module comprising:
a condensate container having an inner wall surface;
an air outlet disposed at an upper end of said condensate container;
an annular air inlet coaxially surrounding said air outlet at said upper end of said condensate container;
a twist device disposed adjacent said air inlet for providing rotational motion to air entering said condensate container through said air inlet;
a filter system disposed adjacent said air outlet;
a condensate outlet disposed at a lower end of said condensate container; and a partition plate supported in said container for dividing the container interior into an upper filter chamber containing the filter system and a lower condensate collection chamber having the condensate outlet, said partition plate having a conical peripheral wall region terminating at an edge in contact with said inner wall surface of said condensate container, said wall region having a plurality of condensate passage openings disposed at said contact edge for preventing transmission of the rotational motion of the air past said partition plate, wherein said partition plate includes a concentric threaded bolt portion extending opposite said contact edge for supporting said partition plate from above, and wherein each of said condensate passage openings is provided with two flow brake elements for preventing transmission of the rotational motion of the air past said partition plate.

11. A condensate filter as defined in claim 10, wherein said twist device rotates the air about an axis of rotation, and wherein each of said flow brake elements have planar faces disposed parallel with said axis of air rotation for stopping the rotational motion of the air.

12. A condensate filter as defined in claim 1, wherein said partition plate includes a concrentric threaded bolt portion extending opposite said contact edge for supporting said partition plate from above.

13. A condensate filter as defined in claim 1, said partition plate having a concentric threaded bolt portion for attaching said partition plate to at least one of said twist device and said filter system.

14. A condensate filter as defined in claim 13, wherein said twist device rotates the air about an axis of rotation, and wherein each of said flow brake elements have planar faces disposed parallel with said axis of air rotation for stopping the rotational motion of the air.

* * * * *

UNITED STATES PATENT AND TRADEMARK OFFICE
CERTIFICATE OF CORRECTION

PATENT NO. : 7,537,624 B2  Page 1 of 1
APPLICATION NO. : 11/105086
DATED : May 26, 2009
INVENTOR(S) : Robert Jachmann It is certified that error appears in the above-identified patent and that said Letters Patent is hereby corrected as shown below:

<u>Column 6, line 5</u>:

Now reads: "a concrentric threaded"   Should read: -- a concentric threaded --

Signed and Sealed this

First Day of September, 2009

David J. Kappos
*Director of the United States Patent and Trademark Office*